(12) United States Patent
Saito et al.

(10) Patent No.: US 8,953,053 B2
(45) Date of Patent: Feb. 10, 2015

(54) IMAGE PROCESSING APPARATUS, IMAGE PICKUP APPARATUS, AND IMAGE PROCESSING METHOD

(75) Inventors: Mitsuhiro Saito, Yokohama (JP);
Takahiro Takahashi, Utsunomiya (JP);
Hidetoshi Tsubaki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 160 days.

(21) Appl. No.: 12/840,416

(22) Filed: Jul. 21, 2010

(65) Prior Publication Data

US 2011/0019016 A1     Jan. 27, 2011

(30) Foreign Application Priority Data

Jul. 21, 2009    (JP) ................................. 2009-170645

(51) Int. Cl.
   *H04N 5/228*      (2006.01)
   *G03B 17/00*      (2006.01)
   *H04N 5/232*      (2006.01)
   *G06T 5/00*       (2006.01)

(52) U.S. Cl.
   CPC ............ *H04N 5/23248* (2013.01); *G06T 5/003* (2013.01); *H04N 5/23254* (2013.01); *G06T 2207/10016* (2013.01); *G06T 2207/20201* (2013.01)
   USPC .......................... 348/208.6; 396/52; 348/208.4

(58) Field of Classification Search
   USPC .................. 348/208.3, 208.6, 208.99, 208.11, 348/208.1, 208.2, 208.4; 396/52, 53–55
   See application file for complete search history.

(56) References Cited

U.S. PATENT DOCUMENTS

| | | | | |
|---|---|---|---|---|
| 5,959,666 | A * | 9/1999 | Naganuma | 348/208.3 |
| 6,982,746 | B1 * | 1/2006 | Kawahara | 348/208.99 |
| 8,294,773 | B2 * | 10/2012 | Oshino et al. | 348/208.6 |
| 2005/0140793 | A1 * | 6/2005 | Kojima et al. | 348/208.99 |
| 2009/0128700 | A1 * | 5/2009 | Oshino et al. | 348/580 |

FOREIGN PATENT DOCUMENTS

| | | |
|---|---|---|
| JP | 08-331430 A | 12/1996 |
| JP | 3642085 B2 | 4/2005 |
| JP | 3671972 B2 | 7/2005 |
| JP | 2008-259076 A | 10/2008 |

OTHER PUBLICATIONS

Japanese Office Action for corresponding JP 2009-170645, mail date Jun. 18, 2013.

* cited by examiner

*Primary Examiner* — Ahmed A Berhan
(74) *Attorney, Agent, or Firm* — Rossi, Kimms & McDowell LLP

(57) ABSTRACT

An image processing apparatus of the present invention includes a shake detector 109 which detects a shake of an image pickup apparatus, a shake analyzer 112 which obtains features of a plurality of shake components whose kinds are different from each other, a parameter calculator 113 which calculates a filtering process parameter depending on the features for each of the shake components, and a processor 114 which performs a filtering process using the filtering process parameter calculated for each of the shake components to calculate a shake reduction amount and performs a shake reduction process based on the shake reduction amount with respect to the image.

9 Claims, 7 Drawing Sheets

IMAGE PROCESSING APPARATUS, IMAGE PICKUP APPARATUS, AND IMAGE PROCESSING METHOD

BACKGROUND OF THE INVENTION

1. Field of the Invention

The present invention relates to an image processing apparatus and an image processing method which perform an image processing to reduce an image-shake of an image caused by a shake of an image pickup apparatus.

2. Description of the Related Art

As an anti-shake method for reducing an image-shake of an image caused by a shake such as a camera shake of an image pickup apparatus, there is a so-called electronic anti-shake method. One of conventional electronic anti-shake methods calculates an image change amount of one motion vector or the like which indicates a change amount in an entire image to perform a shake reduction process with respect to the image based on the image change amount. However, in many cases, an actual shake of the image pickup apparatus contains a plurality of shake components such as a translation, a rotation, and a tilt whose kinds are different from each other.

In an image shake reduction method disclosed in Japanese Patent No. 3642085, a shake of an image pickup apparatus is detected to determine whether the shake is caused by a willful motion of the image pickup apparatus or not.

Japanese Patent No. 3671972 discloses an image shake reduction method which detects shake components in horizontal and vertical directions independently to perform a shake reduction process with respect to the shake components in the horizontal and vertical directions individually.

BRIEF SUMMARY OF THE INVENTION

The present invention provides an image processing apparatus and an image pickup apparatus capable of obtaining a good image shake reduction effect with respect to the shake containing a plurality of shake components whose kinds are different from each other, such as a translation, a rotation, or a tilt, when performing an electronic anti-shake process.

An image processing apparatus as one aspect of the present invention performs a filtering process with respect to an image to reduce an image-shake of the image caused by a shake of an image pickup apparatus. The image processing apparatus includes a shake detector configured to detect the shake applied to the image pickup apparatus, a shake analyzer configured to obtain features of a plurality of shake components whose kinds are different from each other, included in the shake detected by the shake detector, a parameter calculator configured to calculate a filtering process parameter depending on the features for each of the shake components, and a processor configured to perform a filtering process using the filtering process parameter calculated for each of the shake components to calculate a shake reduction amount and perform a shake reduction process based on the shake reduction amount with respect to the image.

An image processing method as another aspect of the present invention performs a filtering process with respect to an image to reduce an image-shake of the image caused by a shake of an image pickup apparatus. The image processing method includes a shake detecting step of detecting the shake of the image pickup apparatus, a shake analyzing step of obtaining features of a plurality of shake components whose kinds are different from each other, which are included in the shake detected by the shake detecting step, a parameter calculating step of calculating a filtering process parameter depending on the features for each of the shake components, and a processing step of performing a filtering process using the filtering process parameter calculated for each of the shake components to calculate a shake reduction amount and performing a shake reduction process based on the shake reduction amount with respect to the image.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

Figure 1:
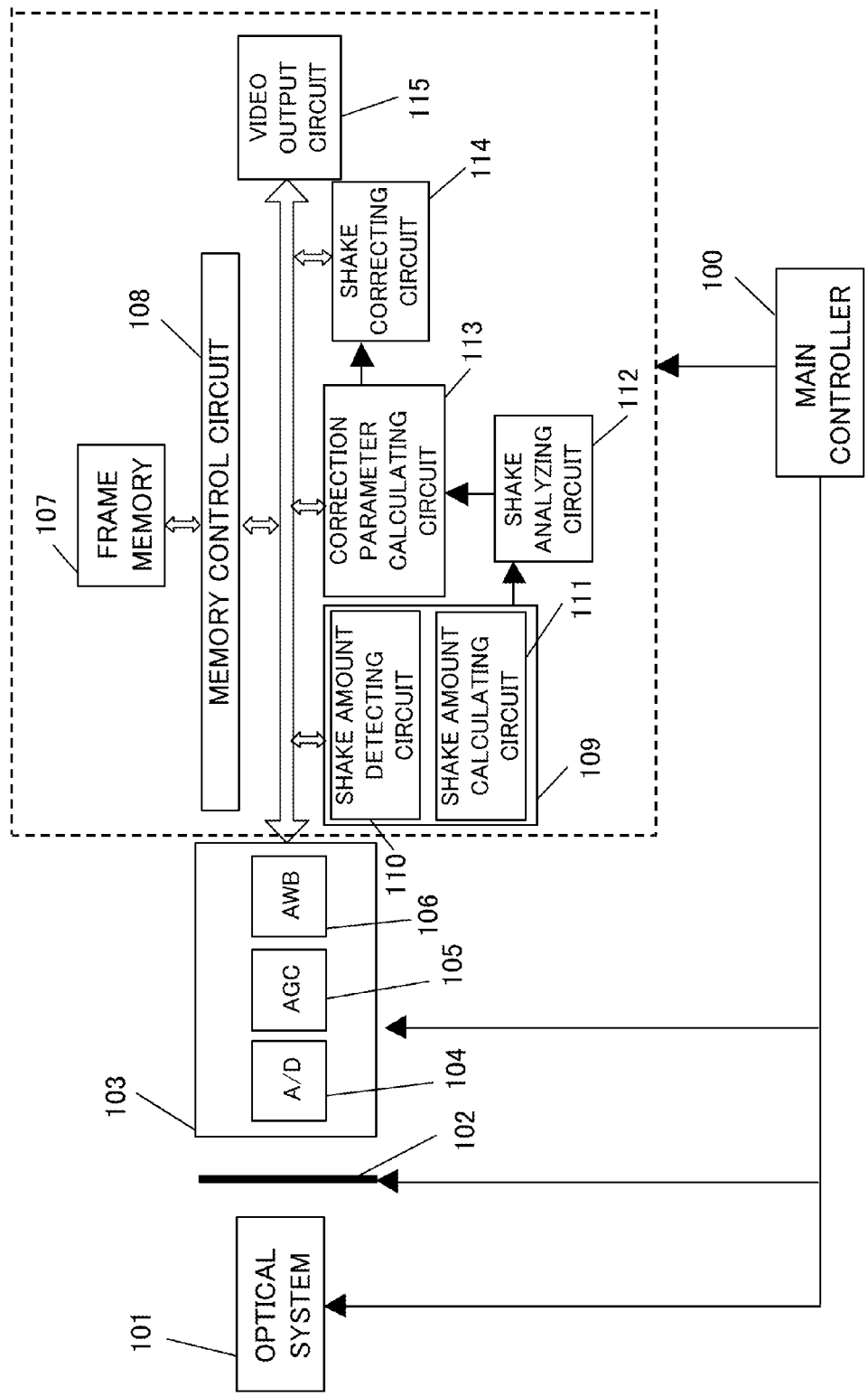
FIG. 1 is a diagram illustrating a configuration of an image pickup apparatus that is Embodiment 1 of the present invention.

FIG. 1 illustrates an image pickup apparatus such as a video camera or a digital still camera including an image processing apparatus that is Embodiment 1 of the present invention. In FIG. 1, reference numeral 101 denotes an image pickup optical system which forms an object image, and reference numeral 102 denotes an image pickup device such as a CCD sensor or a CMOS sensor which performs a photoelectric conversion of the object image formed by the image pickup optical system 101. Reference numeral 103 denotes an image generating circuit (an image generator) which generates a digital video signal based on an analog signal outputted from the image pickup device 102. The video signal is constituted by a plurality of sequential frame images.

The image generating circuit 103 includes an A/D conversion circuit 104, an auto gain control circuit (AGC) 105, and an auto white balance circuit (AWB) 106. The A/D conversion circuit 104 converts an analog signal to a digital signal. The AGC 105 performs a level correction of the digital signal.

The AWB 106 performs a white level correction of the video. An image pickup system is constituted by the image pickup device 102 and the image generating circuit 103.

Reference numeral 107 denotes a frame memory which temporarily stores one or a plurality of frame images of the video signal generated by the image generating circuit 103. Reference numeral 108 denotes a memory control circuit which controls the video signal inputted into and outputted from the frame memory 107.

Reference numeral 109 denotes an image change amount calculating circuit (a shake detector) which is constituted by a shake amount detecting circuit 110 and a shake amount calculating circuit 111. The shake amount detecting circuit 110 calculates a motion vector which corresponds to a shake of the image pickup apparatus based on two sequential (adjacent) frame images. In other words, the image change amount calculating circuit 109 calculates the motion vector to detect the shake of the image pickup apparatus. The shake amount calculating circuit 111 calculates an image change amount which corresponds to a shake amount of the image pickup apparatus based on the motion vector.

Reference numeral 112 denotes a shake analyzing circuit (a shake analyzer) which decomposes the image change amount calculated by the image change amount calculating circuit 109 into an image change amount corresponding to a plurality of shake components whose kinds are different from each other (hereinafter, the image change amount is referred to as a shake component). Then, the shake analyzing circuit 112 obtains a characteristic of each shake component.

The plurality of shake components whose kinds are different include translation (in horizontal and vertical directions), scaling (varying a magnification), rotation, shear, tilt (in horizontal and vertical directions), or the like.

Reference numeral 113 denotes a shake correction parameter calculating circuit (a parameter calculator) which calculates a shake correction parameter (a filtering process parameter) depending on the characteristic of each shake component obtained by the shake analyzing circuit 112.

Reference numeral 114 denotes a shake correcting circuit (a processor) which calculates a shake correction amount by the filtering process using the shake correction parameter calculated by the shake correction parameter calculating circuit 113 to perform a coordinate conversion process that is a geometric conversion process of an image based on the shake correction amount.

Reference numeral 115 denotes a video output circuit which outputs a video for which the shake correction has been performed to a display (not shown) or to a recording medium such as a semiconductor memory, an optical disc, or a magnetic tape.

Reference numeral 100 denotes a main controller which controls operations of the image pickup device 102, the image generating circuit 103, the memory control circuit 108, the image change amount calculating circuit 109, the shake analyzing circuit 112, the shake correction parameter calculating circuit 113, the shake correcting circuit 114, and the video output circuit 115. The main controller 100 is constituted by a CPU or the like.

The image processing apparatus which reduces an image-shake of the image caused by the shake of the image pickup apparatus is constituted by the image change amount calculating circuit 109, the shake analyzing circuit 112, the shake correction parameter calculating circuit 113, and the shake correcting circuit 114.

Referring to a flowchart illustrated in FIG. 2, the operation of the image pickup apparatus configured as above (the image processing method) will be described. The operation described herein is performed in accordance with a computer program (a software) stored in a memory (not shown) of the main controller 100. This is also true for the following embodiments.

Figure 2:
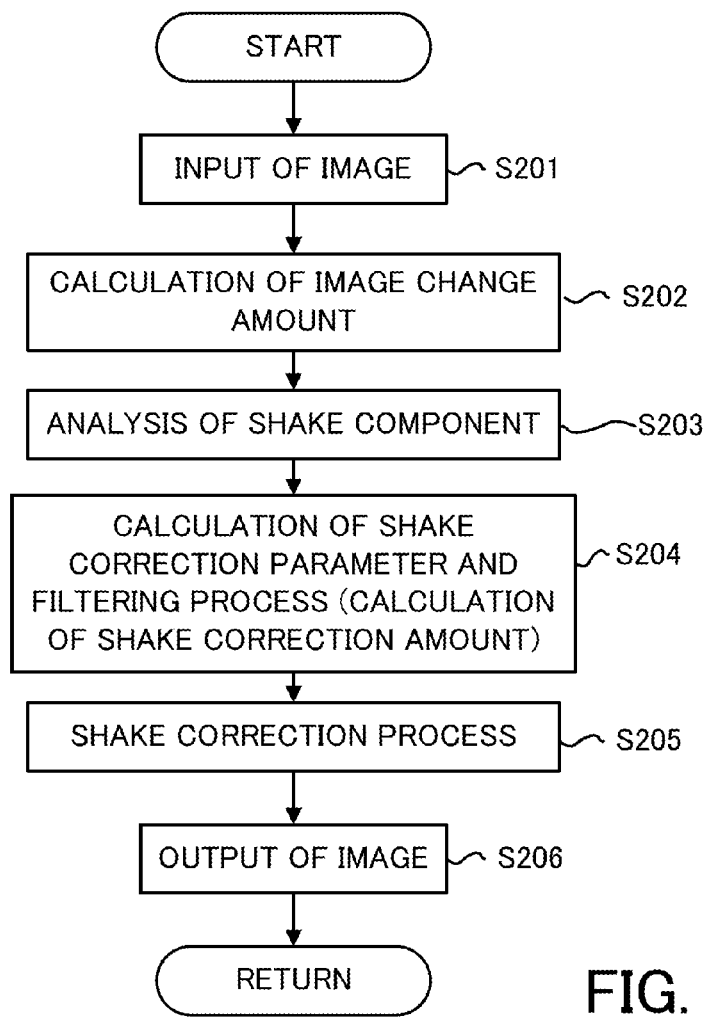
FIG. 2 is a flowchart illustrating a flow of a shake correction process in Embodiment 1.

In FIG. 2, in Step S201, a photoelectric conversion of the object image formed by the optical system 101 is performed by the image pickup device 102. The image pickup device 102 outputs an analog signal depending on the object luminance to input the analog signal to the image generating circuit 103. The image generating circuit 103 converts the analog signal into for example twelve-bit digital signal by the A/D conversion circuit 104. Further, the AGC 105 and the AWB 106 perform a signal level correction and a white level correction of the digital signal, respectively. Thus, a frame image as an input image constituting a digital video signal is generated. The frame image is temporarily stored in the frame memory 107.

In the image pickup apparatus, the frame images are sequentially generated at a predetermined frame rate, and the frame images stored in the frame memory 107 are sequentially inputted to the image change amount calculating circuit 109.

In Step S202, the shake amount detecting circuit 110 detects a displacement of the object image between two sequential frame images and a motion vector indicating its direction. The detection of the motion vector may be performed by using a common detecting method such as a template matching method or a gradient method, but the embodiment is not limited to these methods. The motion vector is detected in a plurality of image regions in the frame image. The motion vector is shake information which indicates the shake amount of the object appearing in the video and its direction.

The motion vectors in the plurality of image regions detected by the shake amount detecting circuit 110 are inputted to the shake amount calculating circuit 111. The shake amount calculating circuit 111 integrates the inputted motion vectors in the plurality of image regions to calculate the image change amount that is a change amount in the entire image. The calculation of the image change amount corresponds to generating an expression representing the image change amount such as a homography determinant.

In Step S203, the shake analyzing circuit 112 decomposes the image change amount calculated by the shake amount calculating circuit 111 into a plurality of shake components which have different kinds of components to obtain a characteristic of each shake component. Hereinafter, a shake analyzing method by the shake analyzing circuit 112 will be described.

In Step S202, the image change amount is for example represented by a homography matrix H as follows.

$$H = \begin{bmatrix} h_1 & h_2 & h_3 \\ h_4 & h_5 & h_6 \\ h_7 & h_8 & h_9 \end{bmatrix}$$

In order to analyze the shake, the image change amounts calculated between an i-th frame image and an (i−1)th frame image need to be accumulated by the shake amount calculating circuit 111 to obtain the time-series change of the image change amounts.

In the embodiment, the image change amount between the i-th frame image and the (i−1)th frame image is defined as Hi. An accumulated image change amount when a k-th frame is defined as a reference frame (hereinafter, referred to simply as an accumulated change amount) Hacc is obtained by accumulating (k+1)th and subsequent image change amounts as follows.

$$Hacc = H_{k+i}H_{k+1-1}...H_{k+1} = \begin{bmatrix} h_{acc1} & h_{acc2} & h_{acc3} \\ h_{acc4} & h_{acc5} & h_{acc6} \\ h_{acc7} & h_{acc8} & h_{acc9} \end{bmatrix} (i \geq k)$$

Accordingly, the image change amounts between the frame images are sequentially accumulated with respect to Hacc to be able to obtain the transition of the change of the image change amount with reference to the k-th frame image.

However, each term of Hacc has a value where a plurality of shake components are mixed. Therefore, the motion change actually generated in the image cannot be known based on the transition of the time-series change of each term.

In the embodiment, a component conversion of each term of Hacc is performed to be decomposed to a shake component which indicates a specific change amount in the image.

First, with regard to the accumulated change amount Hacc, each term of Hacc is divided by $h_{acc9}$ so as to meet $h_{acc9}=1$ to be normalized.

Then, using the following expression, the accumulated change amount Hacc is converted to a translation $\vec{t}$, scaling (varying a magnification) s, a rotation R, shearing K, tilt $\vec{v}$ as a plurality of different kinds of shake components.

$$Hacc = \begin{bmatrix} sR & \vec{t} \\ \vec{0}^t & 1 \end{bmatrix} \begin{bmatrix} K & \vec{0} \\ \vec{0}^t & 1 \end{bmatrix} \begin{bmatrix} I & \vec{0} \\ \vec{v}^t & 1 \end{bmatrix} = \begin{bmatrix} A & \vec{0} \\ \vec{v}^t & 1 \end{bmatrix}$$

"A" in the right-hand side of the above expression is represented by the following expression.

$$A = RK + \vec{t}\vec{v}^t$$

Therefore, obtaining RK as represented by the following expression and also using the property that the shearing K is an upper triangular matrix, the shearing K and the rotation R are able to be separated by using qr decomposition.

$$RK = A - \vec{t}\vec{v}^t$$

Each shake component calculated using the above expressions is represented by the following expression, where $t_x$ is a horizontal translation, $t_y$ is a vertical translation, θ is a rotational angle, α is an anisotropic magnification, φ is a direction angle of the shearing, $v_x$ is a horizontal tilt, and $v_y$ is a vertical tilt.

$$\vec{t} = [t_x \quad t_y]^t$$
$$\vec{v} = [v_x \quad v_y]^t$$
$$R = \begin{bmatrix} \cos\theta & -\sin\theta \\ \sin\theta & \cos\theta \end{bmatrix}$$
$$K = \begin{bmatrix} \alpha & \tan\phi \\ 0 & 1 \end{bmatrix}$$

Accordingly, the accumulated change amount Hacc can be decomposed into eight shake components of the horizontal translation $t_x$, the vertical translation $t_y$, the rotational angle θ, the anisotropic magnification α, the direction angle φ of the shearing, the horizontal tilt $v_x$, the vertical tilt $v_y$, and the scaling s.

Next, the characteristic of each shake component calculated as above is obtained. In order to explain an example of the shake analysis, changes of horizontal translation shake, vertical translation shake, and scaling shake (measured values) which are obtained by taking images while a photographer walks and their frequency characteristics are illustrated in FIGS. 3 to 5, respectively.

Figure 3:
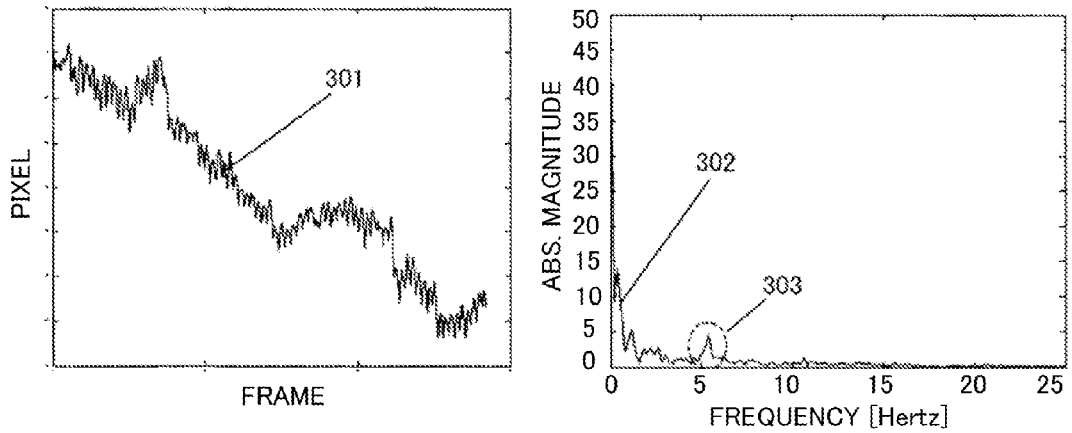
FIG. 3 is a diagram illustrating a change amount of a shake of a vertical translation and a frequency characteristic.

Reference numeral 301 indicated in FIG. 3 denotes a measured value of the vertical translation shake. The vertical translation shake is generated as a shake component having a substantially constant frequency. Reference numeral 302 denotes a frequency characteristic of the vertical translation shake. The frequency of the vertical translation shake, as indicated by reference numeral 303 in FIG. 3, has a characteristic that concentrates on a narrow range around 6 Hz.

Figure 4:
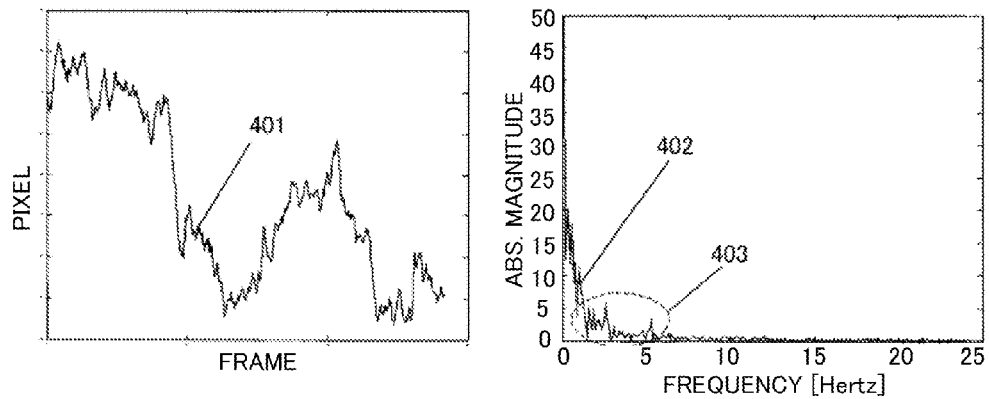
FIG. 4 is a diagram illustrating a change amount of a shake of a horizontal translation and a frequency characteristic.
Figure 5:
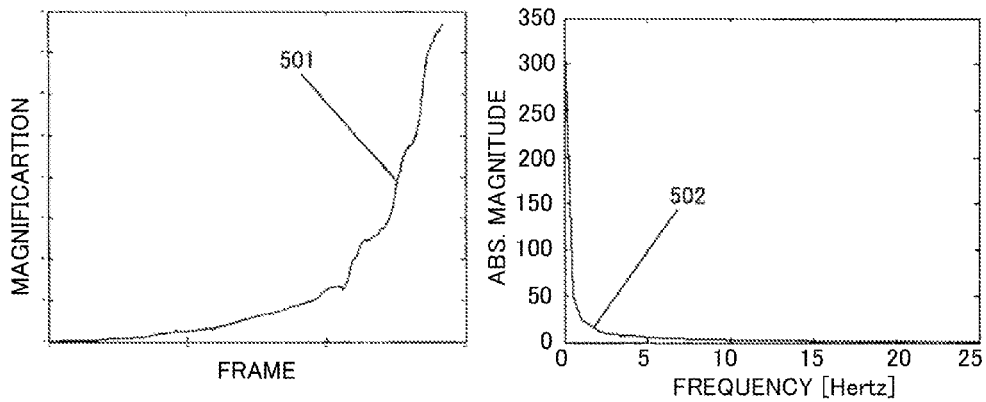
FIG. 5 is a diagram illustrating a change amount of a scaling shake and a frequency characteristic.
Figure 6:
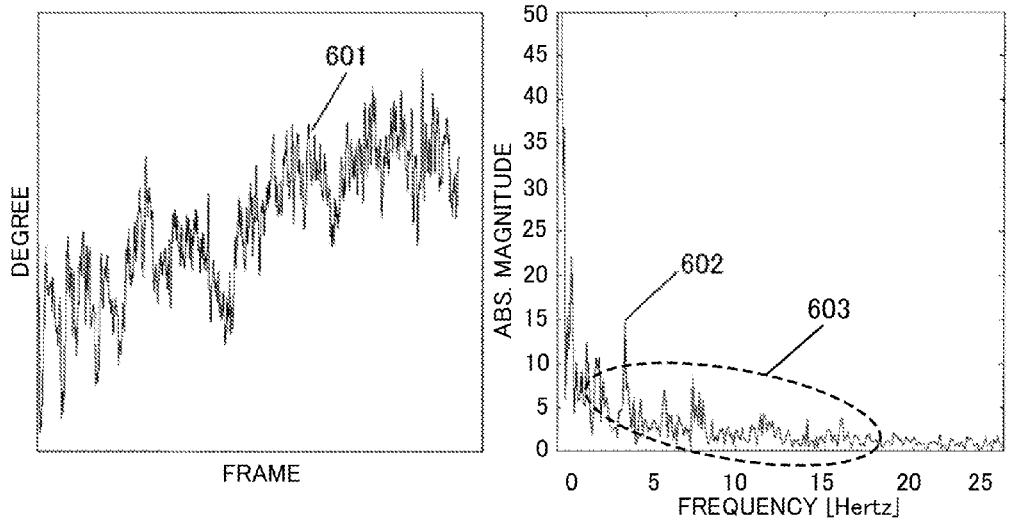
FIG. 6 is a diagram illustrating a change amount of a rotational shake and a frequency characteristic.
Figure 7:
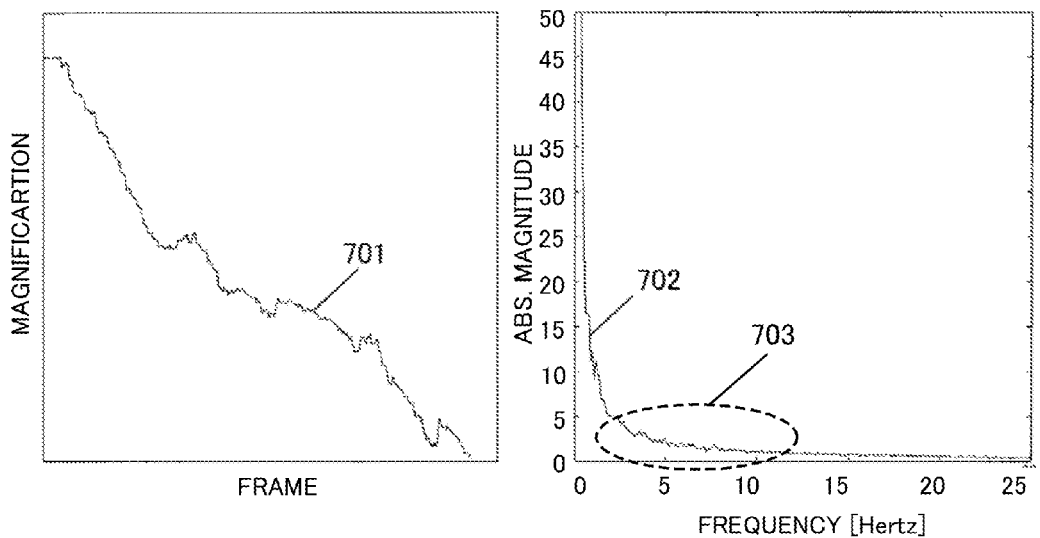
FIG. 7 is a diagram illustrating a change amount of a shearing shake and a frequency characteristic.
Figure 8:
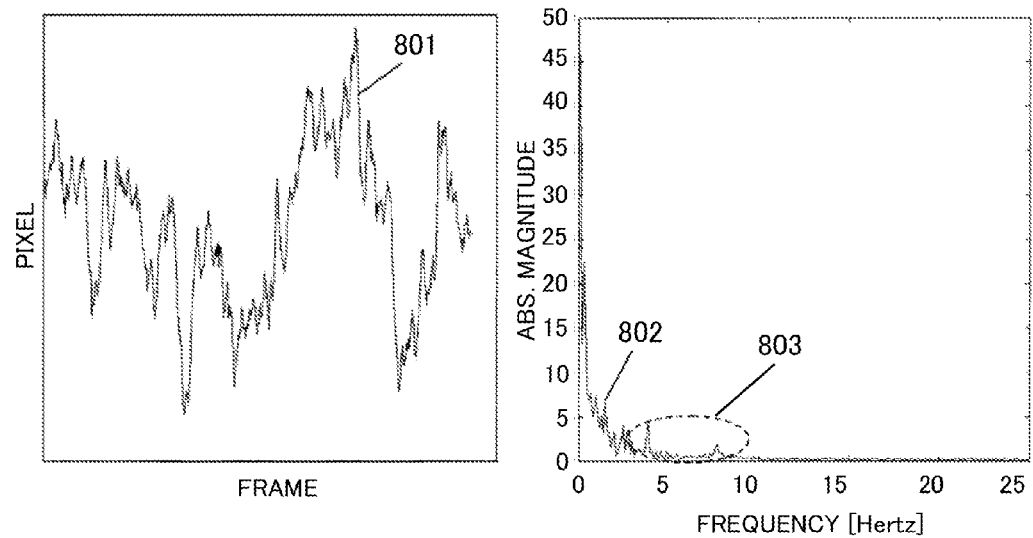
FIG. 8 is a diagram illustrating a change amount of a horizontal tilt shake and a frequency characteristic.
Figure 9:
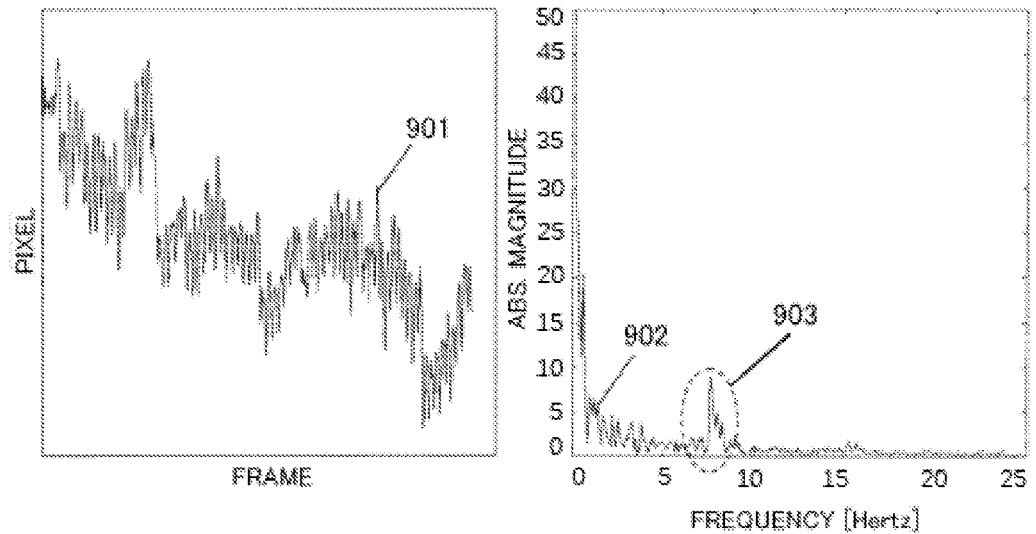
FIG. 9 is a diagram illustrating a change amount of a vertical tilt shake and a frequency characteristic.

Reference numeral 401 indicated in FIG. 4 denotes a measured value of the horizontal translation shake. The horizontal translation shake is generated as a shake where various kinds of shakes are mixed. Reference numeral 402 denotes a frequency characteristic of the horizontal translation shake. The frequency of the horizontal translation, as indicated by reference numeral 403 in FIG. 4, has a characteristic that is distributed in a wide range around 2 to 6 Hz.

Reference numeral 501 is a measured value of the scaling shake. In this example, a value indicating the scale is smoothly changed by the willful motion of the image pickup apparatus, but the scaling shake itself is not substantially generated. Reference numeral 502 denotes a frequency characteristic of the scaling shake. The scaling shake does not have a peak of the frequency where the characteristic of the shake can be determined.

FIGS. 6, 7, 8, and 9 illustrate measured values of rotational, shearing, horizontal tilt, and vertical tilt shakes 601, 701, 801, and 901, and frequency characteristics 602, 702, 802, and 902, respectively. The frequency characteristics 602, 702, 802, and 902 have characteristics 603, 703, 803, and 903, respectively.

In the present embodiment, a case where a feature of the frequency characteristic of each shake component is obtained is described, but instead of the frequency characteristic, the size of an amplitude can be obtained as the feature of the shake component, or the difference between the each shake component and the motion by the camera work may also be obtained as the feature.

The analysis result of the feature of the shake component obtained as above is inputted to the correction parameter calculating circuit 113.

In FIG. 2, in Step S204, the correction parameter calculating circuit 113 calculates a shake correction parameter depending on the feature of each shake component obtained in Step S203. Further, the shake correcting circuit 114 performs a filtering process for each shake component using the calculated shake correction parameter to calculate a shake correction amount (a shake reduction amount) for correcting or reducing each shake component. Then, using the shake correction amount, a coordinate conversion matrix for performing a coordinate conversion process as a shake correction process (a shake reduction process) is generated.

Using the filtering process in calculating the shake correction amount, the above shake component can only be reduced without influencing the willful motion such as panning or tilting of the image pickup apparatus by the photographer.

In the present embodiment, in order to perform the filtering process with respect to each shake component, an FIR filter having cutoff frequency and tap number that are the shake correction parameters depending on the feature of each shake component is created. Hereinafter, as an example of the filtering process, with regard to the horizontal translation $t_x$, a method where the FIR filter applied to the n-tap frame images is created to perform the filtering process will be described.

The FIR filter, in order to calculate the shake correction amount with respect to a specific frame image, needs the accumulated change amount of the shake components of the n-frame images immediately before and after the specific frame image.

Figure 10:
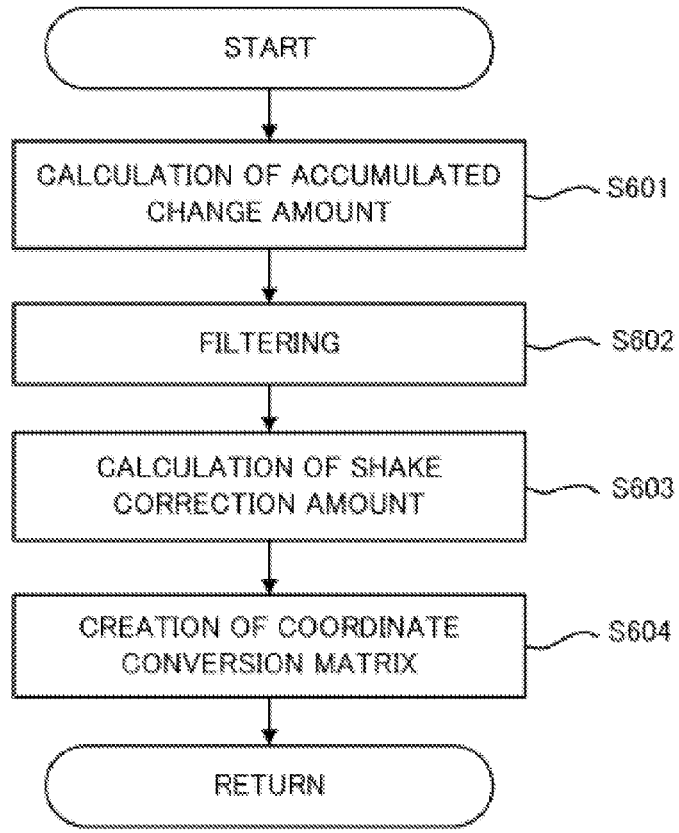
FIG. 10 is a flowchart illustrating a flow of a filtering process in Embodiment 1.

FIG. 10 illustrates a procedure of the process performed in Step S204. First, in Step S601, the correction parameter calculating circuit 113 calculates $t_{x\_acc\,1}, t_{x\_acc\,2}, \ldots, t_{x\_acc\,n}$ that are sequence S of the accumulated change amount with reference to a head of an input sequence, based on the change amount of the horizontal translation $t_x$ calculated between a current input frame image and a frame image immediately before the current input frame image (a past frame image).

An accumulated change amount $t_{x\_acc\,i}$ obtained by accumulating $t_{x\_i}$ that is a change amount of the horizontal translation $t_x$ of a frame image i-frame later with reference to the k-th frame image can be represented as the following expression.

$$t_{x\_acc\,i} = t_{x\_k+i} + t_{x\_k+i-1} + \ldots + t_{x\_k+1} \ (i \geq k)$$

Next, in Step S602, the correction parameter calculating circuit 113 creates the FIR filter having cutoff frequency and tap number that are correction parameters depending on the feature of the horizontal translation t, obtained in Step S203. Then, the filtering process is performed with respect to the sequence S of the accumulated change amount calculated in Step S601. The FIR filter is a filter which calculates an output signal by performing weighted averaging of current and past input signals. For example, when the output signal obtained by inputting the sequence S as the input signal is $t_{x\_acc\_filter}$, the FIR filter is represented by the following expression.

$$t_{x\_acc\_filter} = \alpha_1 t_{x\_acc1} + \alpha_2 t_{x\_acc2} + \ldots + \alpha_n t_{x\_acc\,n}$$

In the above expression, n is a tap number, and $\alpha_i$ is a filter coefficient, i.e. a weighted value with respect to each input signal.

A method of determining cutoff frequency combined with Fourier series method or a window function and of setting a characteristic such as a transitional region or tap number to calculate a coefficient of a filter is often used for creating the filter. In determining the cutoff frequency, the feature of each shake component obtained in Step S203 is used to be able to create the filter suitable for correcting or reducing each shake component.

As illustrated in FIG. 3, the vertical translation shake is concentrated at around 6 Hz. Therefore, a filter coefficient whose cutoff frequency is only around 6 Hz may be set in order to correct the vertical translation shake.

As illustrated in FIG. 4, the horizontal translation shake is distributed in a range around 2 to 6 Hz. Therefore, in order to correct the horizontal translation shake, a filter coefficient whose cutoff frequency is in a range around 2 to 6 Hz may be set.

In creating the filter, when the tap number is larger, the delay is greater although an abrupt filter characteristic can be obtained. In contrast, when the tap number is smaller, the delay can be shorter although the filter characteristic is moderate.

In the present embodiment, the tap number of the filter is set in accordance with the feature of each shake component obtained in Step S203 to create the filter in which the delay of the calculation of the shake correction amount by the filtering process is prevented.

For example, with regard to the vertical translation shake, a large tap number is needed to eliminate only the shake concentrated at around 6 Hz. However, with regard to the horizontal translation shake, since the shake of the frequency in a wide range to some extent needs to be eliminated, there is no problem even if the tap number is small.

Thus, the tap number of the filter is set in accordance with the feature of the shake component to be able to obtain the shake correction amount with a smaller delay amount.

However, when the delay amount to obtain the shake correction amount with respect to the same frame image is different depending on each shake component, a good shake correction process cannot be performed. Therefore, a procedure of adapting delay amounts of other shake components to the largest delay amount of the shake component or the like needs to be performed.

Using the FIR filter created as above, the filtering process is performed with respect to the sequence S of the accumulated change amount to be able to obtain $t_x$ filter that is a filtering shake component as an output signal.

The main object of using the filtering process for calculating the shake correction amount is to correct only the shake without influencing the willful motion of the image pickup apparatus. Therefore, when a picture is taken without moving the image pickup apparatus, the shake correction may be performed only by a simple geometric conversion process without performing the filtering process because an image-shake caused by the shake of the image pickup apparatus is generated on the image.

With regard to the scaling shake illustrated in FIG. 5, as described above, the willful motion of the image pickup apparatus only occurs and the shake itself is not generated. Therefore, it may be determined that the shake correction process is not necessary.

In Step S603, the correction parameter calculating circuit 113 calculates $t_{x\_stb}$ that is the shake correction amount using $t_{x\_acc\_filter}$ that is the filtering motion component and $t_{x\_acc}$ that is the accumulated change amount of the horizontal translation shake in the frame image that is an object of the shake correction.

Then, using the following expression, the motion of the frequency component that is a willful camera work can remain based on the accumulated change amount of the horizontal translation shake and the shake correction amount where only the horizontal translation shake is eliminated can be calculated.

$$t_{x\_stb} = t_{x\_acc} - t_{x\_acc\_filter}$$

In the present embodiment, by using the same method as the calculation method of the shake correction amount with respect to the horizontal translation shake described above, shake correction amounts for performing good shake corrections with respect to all the shake components are calculated.

In the present embodiment, the case where the FIR filter is used for the filtering process is described, but a different filter such as an IIR filter or a Kalman filter may also be used. As a simpler model, a method of calculating a movement average value or the like may also be used.

In Step S604, the shake correcting circuit 114 creates the coordinate conversion matrix for performing the coordinate conversion process as a shake correction process using the shake correction amount calculated in Step S603.

The shake correction amount obtained in Step S603 is a shake correction amount of each shake component decomposed by performing a component conversion with respect to the homography matrix representing the image change amount. Therefore, in order to perform the coordinate conversion process with respect to the frame image, a shake correction homography matrix needs to be generated based on the shake correction amount of each shake component.

In the embodiment, the shake correction amounts of each shake component obtained in Step S603 are defined as a horizontal translation $t_{x\_stb}$, a vertical translation $t_{y\_stb}$, scaling $S_{stb}$, a rotational angle $\theta_{stb}$, an anisotropic magnification of shearing $\alpha_{stb}$, a direction angle of the shearing $\phi_{stb}$, a horizontal tilt $v_{x\_stb}$, and a vertical tilt $v_{y\_stb}$, respectively.

In this case, a translational shake correction coordinate conversion matrix $\vec{t}_{stb}$, a tilt shake correction coordinate conversion matrix $\vec{v}_{stb}$ a rotational shake correction coordinate conversion matrix $R_{stb}$, and a shearing shake correction coordinate conversion matrix $K_{stb}$ are respectively as follows.

$$\vec{t}_{stb} = [\ t_{x\_stb}\ \ t_{y\_stb}\ ]^t$$

$$\vec{v}_{stb} = [\ v_{x\_stb}\ \ v_{y\_stb}\ ]^t$$

$$R_{stb} = \begin{bmatrix} \cos\theta_{stb} & -\sin\theta_{stb} \\ \sin\theta_{stb} & \cos\theta_{stb} \end{bmatrix}$$

$$K_{stb} = \begin{bmatrix} \alpha_{stb} & \tan\varphi_{stb} \\ 0 & 1 \end{bmatrix}$$

Accordingly, the shake correction homography matrix is represented as follows.

$$H_{stb} = \begin{bmatrix} s_{stb} R_{stb} & \vec{t}_{stb} \\ \vec{0}^T & 1 \end{bmatrix} \begin{bmatrix} K_{stb} & \vec{0} \\ \vec{0}^T & 1 \end{bmatrix} \begin{bmatrix} I & \vec{0} \\ \vec{v}_{stb}^T & 1 \end{bmatrix}$$

In Step S205 of FIG. 2, the shake correcting circuit 114 applies the calculated shake correction homography matrix to each pixel of the frame image for which the shake correction is to be performed to calculate a coordinate value of each pixel after performing the shake correction, and creates coordinate value conversion data for the shake correction. Then, based on the obtained coordinate value conversion data, the pixel value is read based on the frame image stored in the frame memory 107 to transfer the image constituted by the read pixel value as a shake correction image to the video output circuit 115.

In Step S206, the video output circuit 115 outputs the shake correction image to a display or a recording medium.

In the present embodiment, the homography matrix is used to express the image change amount between the frame images, but a matrix such as an affine matrix or a Helmert matrix in which a model of the shake component is simplified may also be used.

As described above, in the present embodiment, features of a plurality of shake components whose kinds are different from each other, which are contained in a generated image-shake caused by the shake of the image pickup apparatus, are obtained. Then, using the features that are different from each other, the filtering process is performed for each shake component to perform an appropriate shake correction process with respect to each shake component. Thus, even if a large and complicated shake as compared with the camera shake is generated in the image pickup apparatus, an image for which a good shake correction has been performed can be generated.

Embodiment 2

Figure 11:
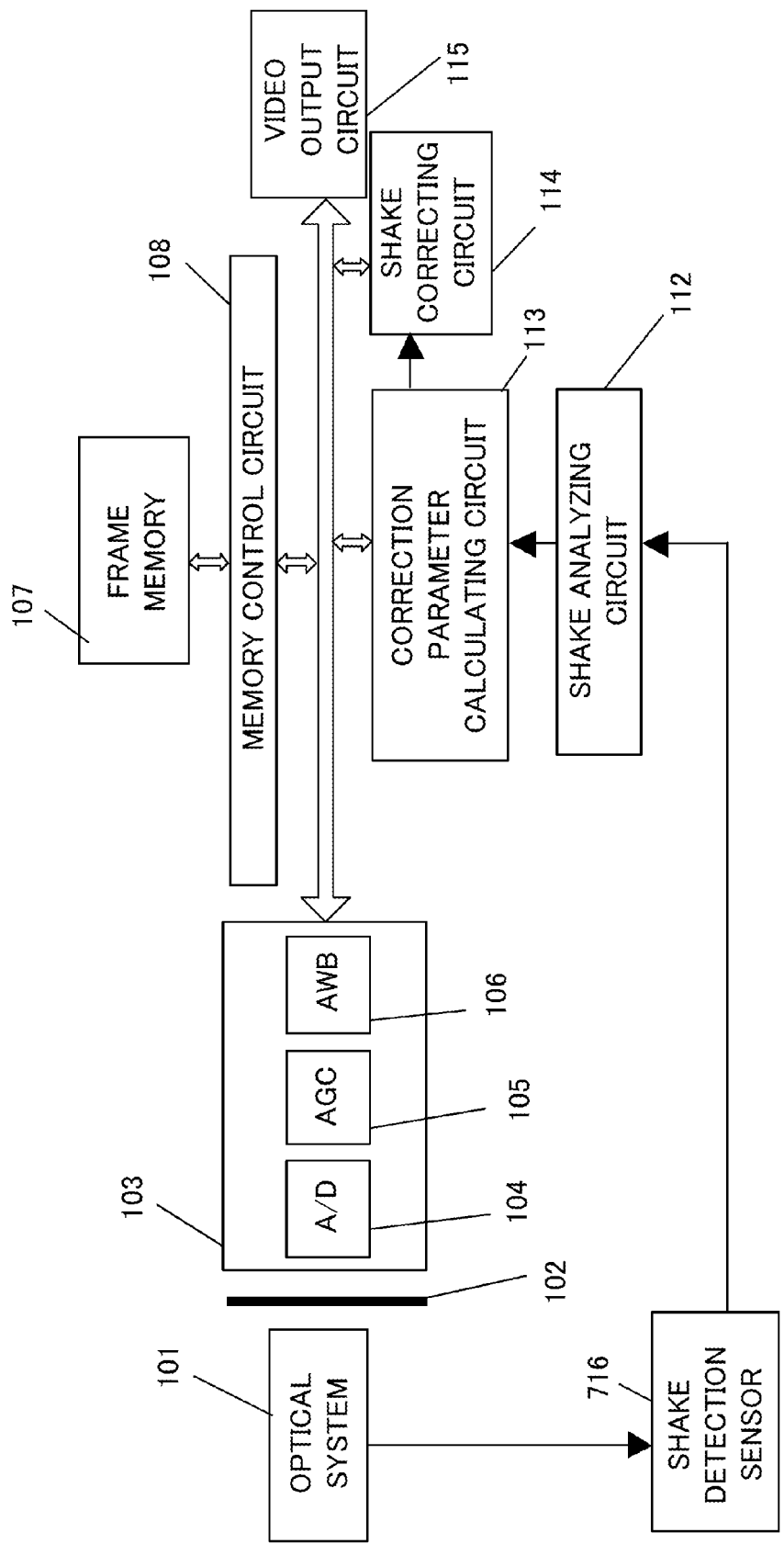
FIG. 11 is a diagram illustrating a configuration of an image pickup apparatus that is Embodiment 2 of the present invention.

FIG. 11 illustrates a configuration of an image pickup apparatus that is Embodiment 2 of the present invention. In Embodiment 1, the case where a motion vector is used for detecting the shake of the image pickup apparatus is described. On the other hand, in the present embodiment, the shake of the image pickup apparatus is directly obtained by using a shake detection sensor (a shake detector) such as a gyro sensor or an acceleration sensor.

In FIG. 11, elements common to those illustrated in FIG. 1 are denoted by the same reference numerals as those in FIG. 1, and descriptions thereof are omitted. The main controller illustrated in FIG. 1 is omitted from FIG. 11.

The image pickup apparatus of the present embodiment includes a shake detection sensor 716 which directly measures the shake of the image pickup apparatus instead of the image change amount calculating circuit 109 illustrated in FIG. 1. In the present embodiment, an image processing apparatus is constituted by the shake detection sensor 716, the shake analyzing circuit 112, the correction parameter calculating circuit 113, and the shake correcting circuit 114.

Figure 12:
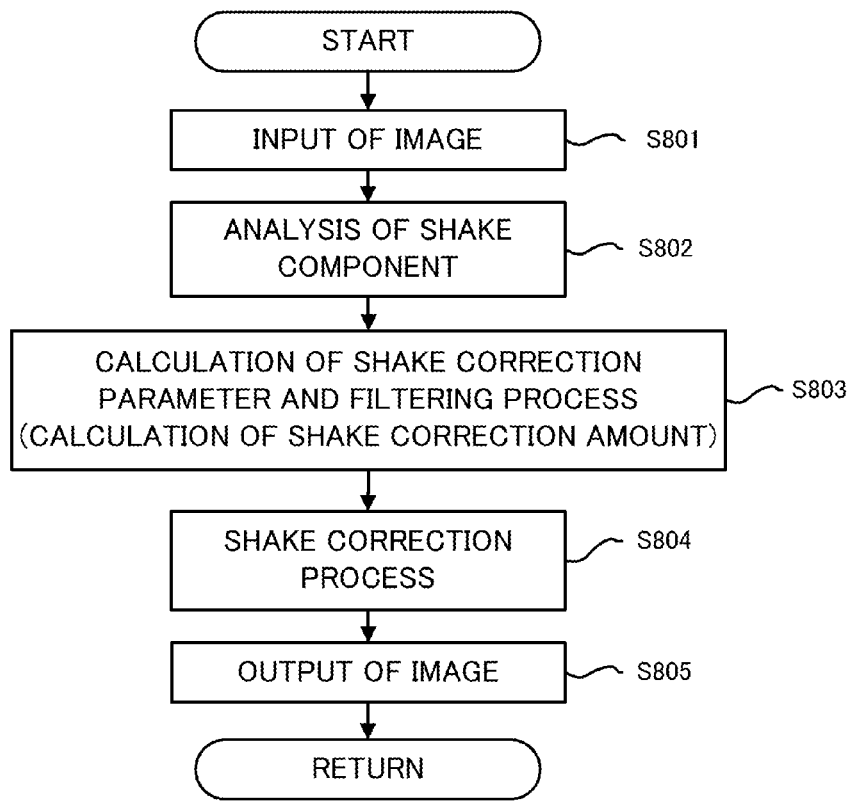
FIG. 12 is a flowchart illustrating a flow of a shake correction process in Embodiment 2.

The operation of the image pickup apparatus of the present embodiment will be described with reference to a flowchart illustrated in FIG. 12. In Step S801, the same operation as that of Step S201 illustrated in FIG. 2 in Embodiment 1 is performed.

In Step S802, similarly to Step S203 illustrated in FIG. 2 in Embodiment 1, the shake analyzing circuit 112 obtains a feature of each shake component using the shake of the image pickup apparatus detected by the shake detection sensor 716. In the present embodiment, the shake detection sensor 716 such as a gyro sensor or an acceleration sensor which is capable of directly detecting the shake of the image pickup apparatus is used, and therefore the calculation of the motion vector or the like as described in Embodiment 1 is not necessary.

The gyro sensor is a sensor capable of detecting a rotation amount centering on the sensor, and for example a three-axis gyro sensor is able to detect rotation amounts in pan, tilt, and yaw directions. The acceleration sensor detects an acceleration applied to the sensor, and for example a three-axis acceleration sensor is able to detect accelerations in x, y, and z-axes directions. The shake amount of the image pickup apparatus can be calculated by performing a time integration of the acceleration in each axis direction. The image pickup apparatus is equipped with one or a plurality of shake detection sensors 716 to be able to obtain the change amount of each shake component of the image pickup apparatus independently.

Steps S803, S804, and S805 perform the same processes as those in Steps S204, S205, and S206, respectively, illustrated in FIG. 2 in Embodiment 1.

In the present embodiment, the features of a plurality of shake components whose kinds are different from each other, which are contained in shakes generated by the shake of the image pickup apparatus, are obtained and the filtering process is performed for each shake component using the features different from each other to perform an appropriate shake correction process with respect to each shake component. Thus, even if a large and complicated shake as compared with the hand shake is generated in the image pickup apparatus, an image for which a good shake correction has been performed can be generated.

In the present embodiment, because the shake detection sensor capable of directly detecting the shake of the image pickup apparatus is used, the shake correction process can be performed at high speed, compared with the case where the calculation process such as the calculation of the motion vector as described in Embodiment 1 is needed.

Embodiment 3

In Embodiments 1 and 2 described above, the case where the image processing apparatus is incorporated in the image pickup apparatus is described, but the present invention is not limited to this.

Figure 13:
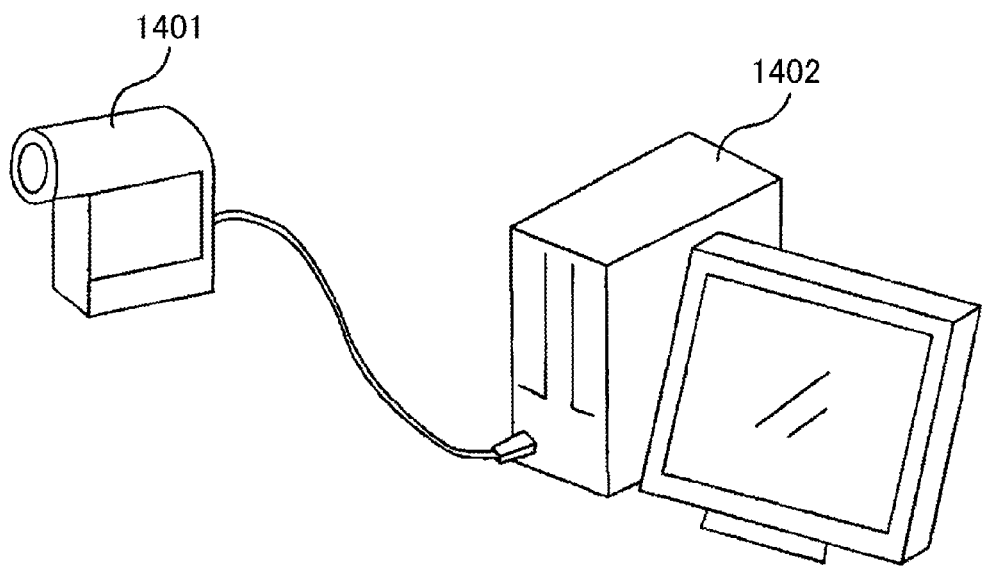
FIG. 13 is a diagram illustrating an image processing apparatus that is Embodiment 3 of the present invention.

For example, as illustrated in FIG. 13, an image (a frame image) taken by an image pickup apparatus 1401 is transmitted to a personal computer 1402. As a transmitting method, a cable method or a wireless method may be used, and the image may also be transmitted through Internet or LAN.

The personal computer 1402 may also perform a process illustrated in the flowchart of FIG. 2. In this case, the personal computer 1402 functions as an image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to each of the above embodiments, the filtering process is performed by using a filtering process parameter in accordance with each feature with respect to a plurality of shake components of the image pickup apparatus to be able to obtain a good image shake reduction effect with respect to each shake component. Therefore, an image processing apparatus and an image pickup apparatus capable of obtaining a good image shake reduction effect with respect to the shake which is large and complicated as compared with a hand shake in performing an electronic anti-shake process can be realized.

This application claims the benefit of Japanese Patent Application No. 2009-170645, filed on Jul. 21, 2009, which is hereby incorporated by reference herein in its entirety.

What is claimed is:

1. An image processing apparatus which reduces an image-shake of an image caused by a shake of an image pickup apparatus, the image processing apparatus comprising:
a shake detector configured to detect the shake applied to the image pickup apparatus;
a decomposer configured to decompose the shake detected by the shake detector to a plurality of shake components including at least translation, rotation, and tilt components;
calculator configured to calculate a filtering process parameter for each of the plurality of components, each of which are different in each of the plurality of shake components and each of which are determined by characteristics of one of the plurality of shake components; and
a processor configured to perform a filtering process using a filtering process parameter calculated for each of the shake components to calculate a shake correction amount, and perform a shake correction process based on the shake correction amount, with respect to the image.

2. An image processing apparatus according to claim 1, wherein each of the filtering process parameters includes a cutoff frequency and a tap number.

3. An image processing apparatus according to claim 1, further comprising an image acquisition unit configured to acquire a plurality of sequential frame images,
wherein the shake detector detects the shake as a motion vector based on two sequential frame images.

4. An image processing apparatus according to claim 1, wherein the shake detector comprises a plurality of shake detection sensors which respectively detects the shake components of at least translation, rotation, and tilt.

5. An image pickup apparatus comprising:
an image pickup system configured to perform an photo-electric conversion of an object image formed by an optical system to generate an image; and
an image processing apparatus configured to reduce an image-shake of the image caused by a shake of the image pickup apparatus, the image pickup apparatus comprising:
a shake detector configured to detect the shake applied to the image pickup apparatus;
a decomposer configured to decompose the shake detected by the shake detector to a plurality of shake components including at least translation, rotation, and tilt components;
a calculator configured to calculate a filtering process parameter for each of the plurality of components, each of which are different in each of the plurality of shake components and each of which are determined by characteristics of one of the plurality of shake components; and
a processor configured to perform a filtering process using the filtering process parameter calculated for each of the shake components to calculate a shake correction amount, and perform a shake correction process based on the shake reduction amount, with respect to the image.

6. An image processing method for reducing an image-shake of an image caused by a shake of an image pickup apparatus, the image processing method comprising:
a shake detecting step of detecting the shake of the image pickup apparatus;
a decomposing step decomposing the shake detected by the shake detecting step to a plurality of shake components including at least translation, rotation, and tilt components;
a calculating step of calculating a filtering process parameter for each of the plurality of components, each of which are different in each of the plurality of shake components and each of which are determined by characteristics of one of the plurality of shake components; and
a processing step of performing a filtering process using the filtering process parameter calculated for each of the shake components to calculate a shake correction amount, and performing a shake reduction process based on the shake correction amount, with respect to the image.

7. An image processing apparatus which reduces an image-shake of an image caused by a shake of an image pickup apparatus, the image processing apparatus comprising:
a shake detector configured to detect the shake applied to the image pickup apparatus;
a decomposer configured to decompose the shake detected by the shake detector to a plurality of shake components including at least translation, and rotation components;
a calculator configured to calculate a filtering process parameter for each of the plurality of components, each of which are different in each of the plurality of shake components and each of which are determined by characteristics of one of the plurality of shake components; and a processor configured to perform a filtering process using a filtering process parameter calculated for each of the shake components to calculate a shake correction amount, and perform a shake correction process based on the shake correction amount, with respect to the image.

8. An image pickup apparatus comprising:

an image pickup system configured to perform an photo-electric conversion of an object image formed by an optical system to generate an image; and an image processing apparatus configured to reduce an image-shake of the image caused by a shake of the image pickup apparatus, the image pickup apparatus comprising:

a shake detector configured to detect the shake applied to the image pickup apparatus;

a decomposer configured to decompose the shake detected by the shake detector to a plurality of shake components including at least translation, and rotation components;

a calculator configured to calculate a filtering process parameter for each of the plurality of components, each of which are different in each of the plurality of shake components and each of which are determined by characteristics of one of the plurality of shake components; and a processor configured to perform a filtering process using the filtering process parameter calculated for each of the shake components to calculate a shake correction amount, and perform a shake correction process based on the shake reduction amount, with respect to the image.

9. An image processing method for reducing an image-shake of an image caused by a shake of an image pickup apparatus, the image processing method comprising:

a shake detecting step of detecting the shake of the image pickup apparatus;

a decomposing step decomposing the shake detected by the shake detecting step to a plurality of shake components including at least translation, and rotation components;

a calculating step of calculating a filtering process parameter for each of the plurality of components, each of which are different in each of the plurality of shake components and each of which are determined by characteristics of one of the plurality of shake components; and a processing step of performing a filtering process using the filtering process parameter calculated for each of the shake components to calculate a shake correction amount, and performing a shake reduction process based on the shake correction amount, with respect to the image.

* * * * *